United States Patent [19]

Harris et al.

[11] Patent Number: 4,839,635

[45] Date of Patent: Jun. 13, 1989

[54] SIGNBOARD FOR DISPLAYING OPTICAL IMAGES

[75] Inventors: Lee M. Harris; Dix L. Evans; Elizabeth A. Midwinter, all of Eugene, Oreg.

[73] Assignee: Inwave Corporation, Eugene, Oreg.

[21] Appl. No.: 2,509

[22] Filed: Jan. 12, 1987

[51] Int. Cl.⁴ ............................................. G09G 3/20
[52] U.S. Cl. .............................. 340/752; 340/815.31
[58] Field of Search ............. 340/705, 752, 753, 754, 340/755, 756, 757, 795, 810, 815.31; 350/96.15, 96.18, 96.2, 96.22, 96.23, 96.24, 96.25, 96.27, 339 F, 339 R, 338, 345; 362/373

[56] References Cited

U.S. PATENT DOCUMENTS

| | | | |
|---|---|---|---|
| 3,310,681 | 3/1967 | Hargens, III | 340/815.31 |
| 3,954,546 | 5/1976 | Aurenz | 350/96.24 |
| 3,963,326 | 6/1976 | Buchert | 340/757 |
| 4,006,476 | 2/1977 | Romney | 340/756 |
| 4,101,188 | 7/1978 | Yevick | 350/96.25 |
| 4,127,319 | 11/1978 | Forney, Jr. et al. | 350/96.22 |
| 4,234,914 | 11/1980 | Boesen | 362/373 |
| 4,310,849 | 1/1982 | Glass | 350/96.15 |
| 4,386,826 | 6/1983 | Stolov | 350/338 |
| 4,598,975 | 7/1986 | Bussard et al. | 350/96.25 |
| 4,629,284 | 12/1986 | Malavieille | 350/96.15 |
| 4,653,863 | 3/1987 | Ito et al. | 350/339 F |
| 4,682,846 | 7/1987 | Cowen | 350/96.18 |

*Primary Examiner*—Gerald L. Brigance
*Assistant Examiner*—Richard Hjerpe
*Attorney, Agent, or Firm*—Stoel Rives Boley Jones & Grey

[57] ABSTRACT

The present invention constitutes a display system (10) for alpha-numeric and graphic images. The system provides a signboard on which varying images of comparably large dimensions can be made to appear. The system comprises an input matrix (12), a display matrix (14), and a large number of optical conductors (16) such as optical fibers which interconnect corresponding parts of the matrixes. Optical images focused on the front face (15) of the input matrix appear in expanded form on the display face (24) of the output matrix. The system may be constructed from a large number of small units (60) comprising an input bundle (62), an output block (22), and a group of optical fibers (66). These units may be easily manufactured by a process involving a limited number of steps.

10 Claims, 5 Drawing Sheets

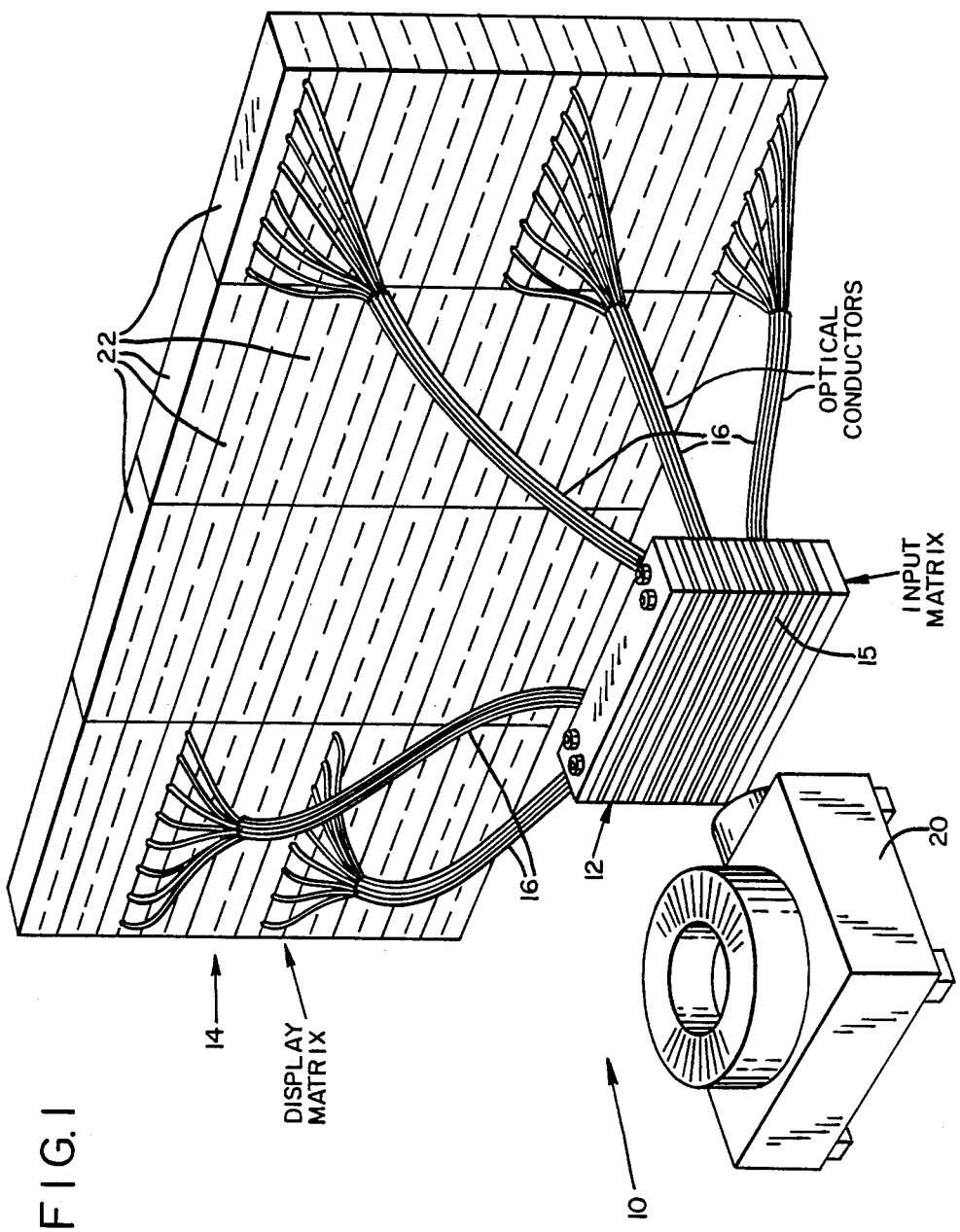

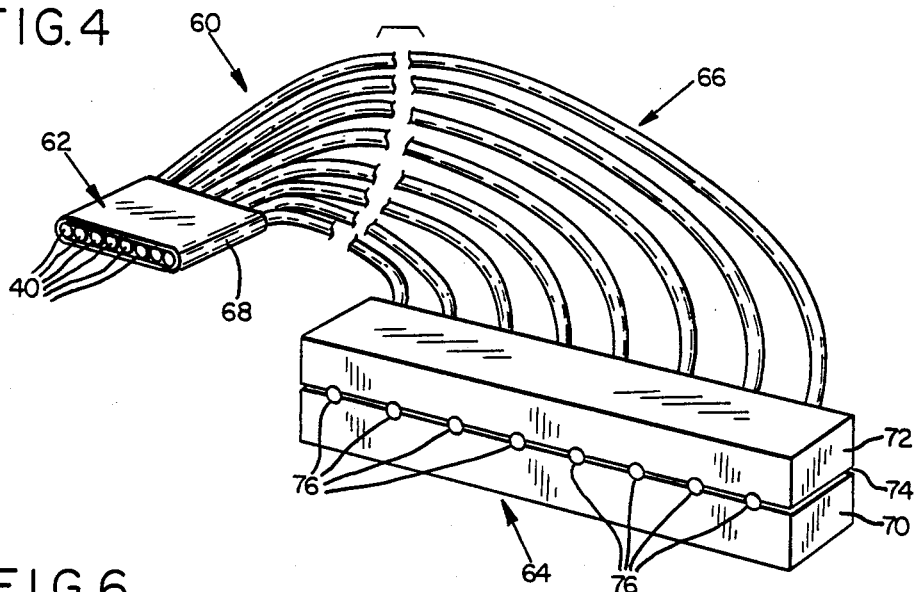
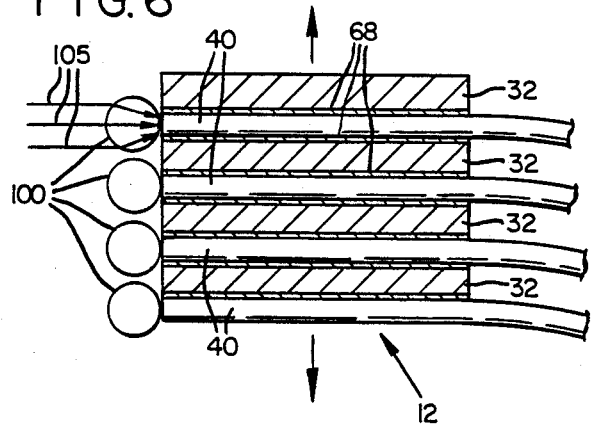
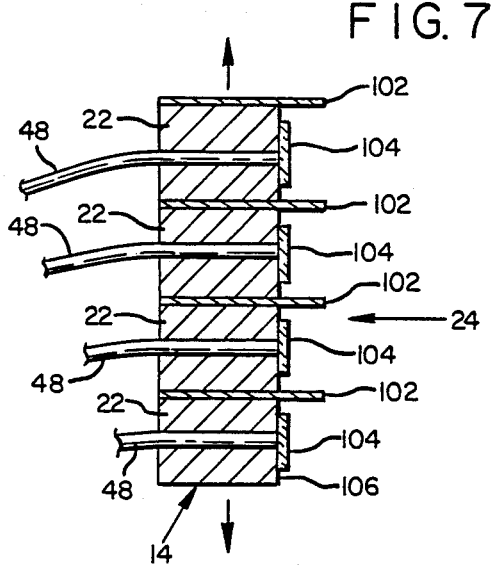

SIGNBOARD FOR DISPLAYING OPTICAL IMAGES

TECHNICAL FIELD

The present invention relates to signboards for displaying varying alpha-numeric and graphic images to large audiences.

BACKGROUND OF THE INVENTION

Several different technologies exist for providing large-size displays of varying alpha-numeric and graphic images. Traditionally, matrixes composed of banks of lamps controlled by complex switching mechanisms have been employed to display such images. However, systems which use banks of lamps have limitations in terms of their color, image fidelity, and animation capacities. Further, these systems require substantial maintenance in order to replace the lamp bulbs which inevitably burn out during use. Electromechanical display signs which use shutters to pass or block light from fluorescent lamps have also come into widespread utilization. However, these displays generally operate too slowly to allow animation and do not provide color capabilities. Very large screen television sets have also been employed as signboards. However, the size, weight, power consumption, and cost of such television displays render these systems impractical for all but a few applications.

SUMMARY OF THE INVENTION

It is an object of the present invention to provide for displaying varying images a new type of signboard which provides good image quality as well as color and animation capabilities.

It is a further object of the present invention to provide a display system which may be easily and less expensively manufactured.

The present invention constitutes a system for displaying varying alpha-numeric and graphic images. The display system comprises an input matrix, a large number of optical conductors having input and output terminals at their opposite ends and a display matrix. The input matrix includes a framework for mounting the input terminals for the optical conductors in a closely packed configuration. The display matrix includes an array of blocks adapted for mounting the output terminals for the optical conductors in a spaced apart configuration. The configuration of the input terminals within the input matrix corresponds to the configuration of the output terminals of the display screen.

In the preferred embodiment, the display system is constructed from subunits comprising an output block including a group of spaced-apart optical conductor output terminals, an input bundle including a group of collinear input terminals and a group of optical fibers connecting the input and the output terminals. The subunits are efficiently manufactured by, among other steps, cementing groups of optical fibers along an interface between substrate strips to form the output blocks and securing the opposite ends of said fibers in closely packed order to form the input bundles.

In operation, optical images are focused on the front face of the input matrix. The light from these images is divided into a large number of small parts as it is received by the input terminals. The light composing the parts is then transmitted by the optical conductors to the display matrix. This light emanates from the display matrix in a pattern of expanded size corresponding to the image received by the input matrix.

BRIEF DESCRIPTION OF THE DRAWINGS

FIG. 1 is a perspective view of the overall system of the present invention.

FIG. 2A shows the framework and structure of the input matrix. FIG. 2B shows the configuration of the input terminals within a section of the input matrix.

FIG. 3A shows the overall structure of the display face. FIG. 3B shows the configuration of the output terminals within a section of the display face.

FIG. 4 is a perspective view of a single light transmission unit as used in constructing the present invention.

FIG. 6 is a lateral cross section of an input matrix component of the present invention including rod lense elements mounted on the matrix.

FIG. 7 is a lateral cross section of a display matrix component of the present invention including dispersing strip and louver elements mounted on the matrix.

DESCRIPTION OF THE PREFERRED EMBODIMENT

Figure 2A:
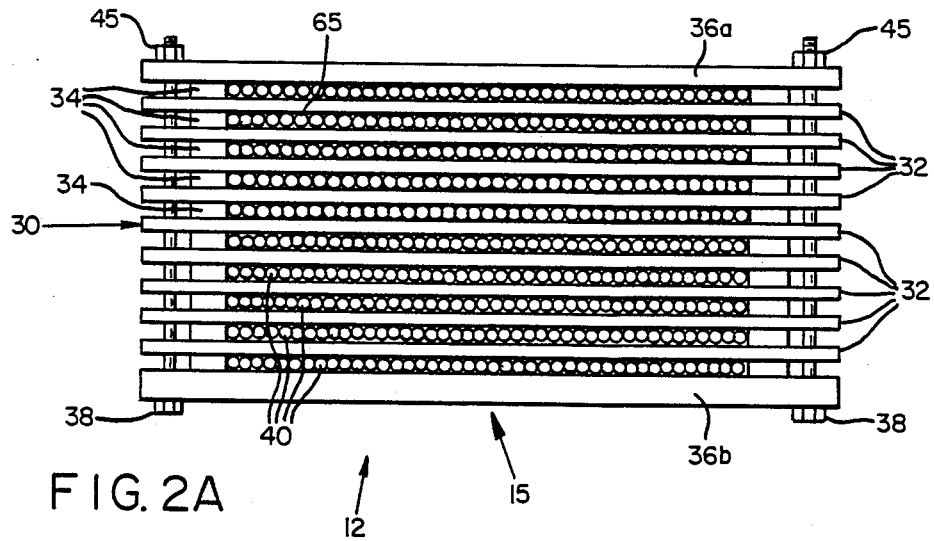
FIGS. 2A and 2B are plan views of the front face of the input matrix component of the present invention.

Referring now to FIG. 1, the preferred embodiment of the present invention constitutes the display system 10 comprising an input matrix 12, a display matrix 14, and a large number of the optical conductors 16 (of which only a limited number are shown in FIG. 1) connected between them. The input matrix 12 includes a planar front face 15 upon which an optical image may be projected from a source such as the slide projector 20. The optical conductors 16 connect the input matrix 12 to the display matrix 14 and provide for the transmission of light from the input matrix 12 to the display matrix 14. The display matrix 14 is constructed of a large number of output blocks 22 (representative blocks indicated at 22). The display matrix includes a display face 24 (not shown in FIG. 1) from which light emanates to form the images displayed by the system 10.

Figure 2B:
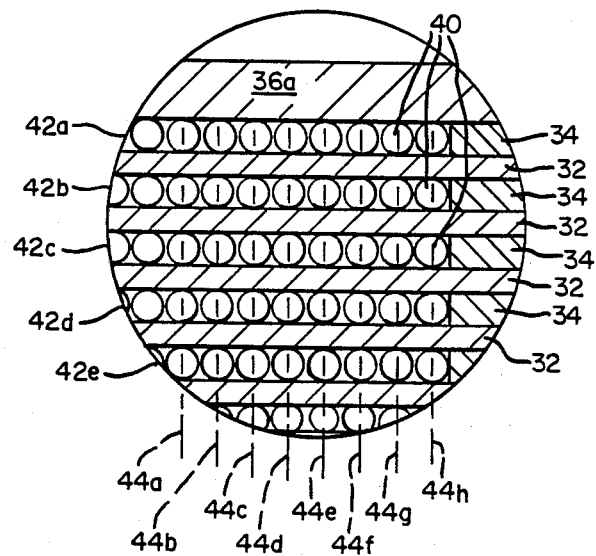

Referring now to FIG. 2A, the construction of the input matrix 12 is shown in greater detail. The input matrix 12 comprises a framework 30 including a set of grid plates 32, a set of spacers 34 (representative spacers indicated at 34), two clamping plates 36a and 36b, and registration bolts 38. The grid plates 32 are made from relatively thin sheet metal having good heat conductance such as aluminum for assisting in dissipating any heat build-up from light focused on the input matrix 12. The grid plates 32 are arranged in a stack of parallel plates. Adjacent plates 32 within the stack are separated by pairs of spacers 34. As shown in FIG. 2B, the recesses formed between the plates 32 by the spacers 34 are used for mounting rows 42a–42e of input terminals 40 (representative terminals indicated at 40) to the optical conductors 16 which extend parallel to the plates 32. The input terminals 40 within the rows 42a–42e also form columns 44a–44h of input terminals 40 which extend perpendicular to the rows 42a–42e. The grid plates 32, spacers 34, and input terminals 40 are secured in position by the clamping plates 36a and 36b and bolts 38. The clamping plate 36a extends across the top of the stack of grid plates 32, and the clamping plate 36b extends across the bottom of the stack of grid plates 32. The bolts 38 extend up through holes (not shown) in the grid plates 32 and clamping plates 36 and retain the grid plates, spacers 34 and input terminals 40 together when the nuts 45 are tightened down onto the bolts 38.

Figure 3A:
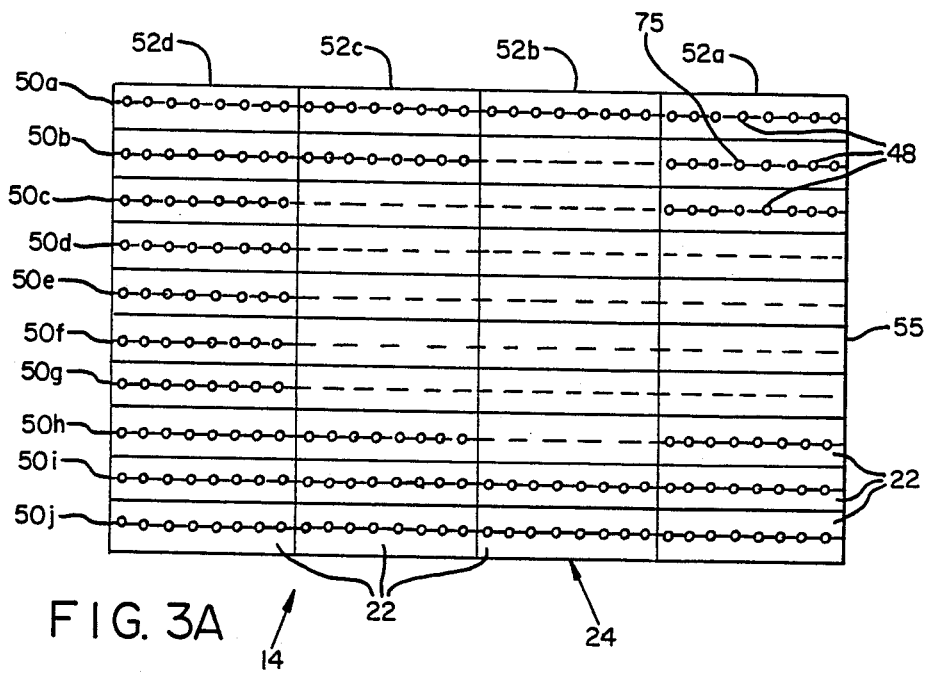
FIGS. 3A and 3B are plan views of the display face of the display matrix component of the present invention.
Figure 3B:
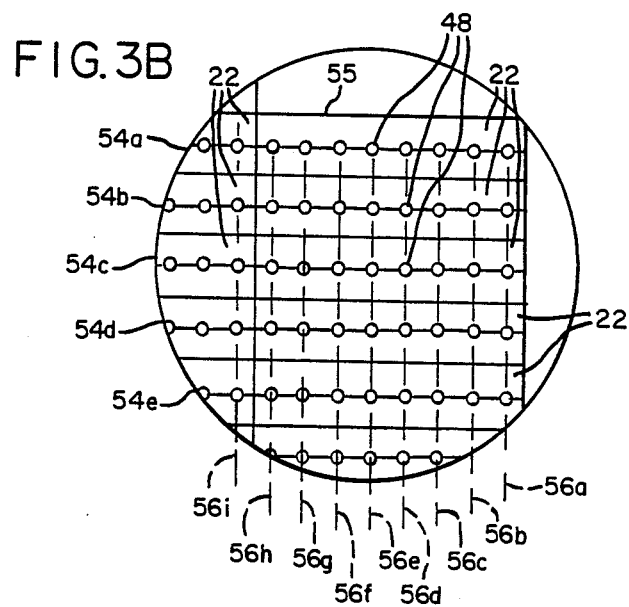

Referring now to FIG. 3A, the display matrix 14 includes an array 55 of output blocks 22 (representative 30 blocks indicated at 22) stacked in parallel rows 50a-50j and in columns 52a-52d perpendicular to the rows 50a-50j. The output blocks 22 provide spaced-apart mounting locations for the output terminals 48 (representative terminals indicated at 48) for the optical conductors 16 and allow for the positioning of the output terminals 48 in groups within the array 55. The output terminals 48 for the optical conductors 16 are positioned along interfaces 50 (representative interfaces indicated at 50) extending longitudinally through the middle of each block 22. As shown in FIG. 3B, the output terminals 48 form rows 54a-54e of parallel output terminals 48. The output terminals 48 within the rows 54a-54e also form columns 56a-56i of output terminals 48 extending perpendicular to the rows 54a-54e.

The optical conductors 16 comprise long and thin waveguides such as acrylic optical fibers for receiving light at one end, transmitting this light through the conductor 16, and emanating this light at the other end. For the purpose of efficiently receiving and emanating light, the optical conductors 16 include input and output terminals 40 and 48. These terminals 40 and 48 are formed from the ends of the optical conductors 16 by having the optical fibers cleanly severed at right angles to their long axes and having the axial ends generated thereby polished to provide smooth and clear surfaces.

The optical conductors 16 connect the input matrix 12 to the display matrix in a prescribed pattern. Each input terminal 40 is separately connected by an optical conductor 16 to a different output terminal 48 on a one-to-one basis. The output terminals 48 occupy positions within the rows 54 and columns 56 of the display matrix 14 geometrically similar to the positions occupied by the input terminals 40 o which they are connected within the rows 42 and columns 44 of the input matrix 12. For example, an input terminal 65 (FIG. 2A) in the second row and fifth column on the front face 15 of the input matrix 12 would be connected to a corresponding output terminal 75 (FIG. 3A) in the second row and fifth column (from the right) on the display face 24 of the input matrix 14. The different portions of the face 15 of the input matrix 12 are thereby optically interconnected with corresponding portions of the display face 24 of the output matrix 14.

In operation, these interconnections allow the system 10 to transmit images part-by-part from the front face 15 of the input matrix 12 to the display face 24 of the output matrix 14. The light from images focused on the front face 15 emanates from the display face 24 to form expanded images which reflect the structure of the original images provided to the input matrix 12 (but may have a different aspect ratio). An image from a source such as the projector 20 in FIG. 1 can thereby be displayed in magnified form by the system 10 on the display face 24.

The system 10 may be viewed as constructed from a large number of light transmission units which allow the system to be conveniently assembled from components. FIG. 4 illustrates one unit 60 including an input bundle 62, an output block 64 and a group of optical fibers 66 connecting the input bundle 62 to the output block 64. The input bundle 62 comprises a group of collinear input terminals 40 to the fibers 66 around which a length of metal foil tape 68 has been wrapped. The tape 68 functions to hold the input terminals 40 together in a closely packed order and to help transfer heat away from the input terminals. The output block 64 comprises a pair of substrate strips 70 and 72 of foam material which are cemented together along an interface 74 which mounts the output terminals 48 to the fibers 66 in a linearly spaced-apart order. Each of the optical fibers 66 connects a specific input terminal to its correlative output terminal which occupies a linear position among the output terminals 48 of the block 64 similar to the linear position occupied by the specific input terminal among the input terminals 40 of the input bundle 62. When the system 10 is assembled, input bundles such as the bundle 62 are placed between the grid plates 32 to form the rows 42 of input terminals for the input matrix 12, and output blocks such as block 64 are stacked together to form the array 55 of the display matrix 14.

Figure 5A:
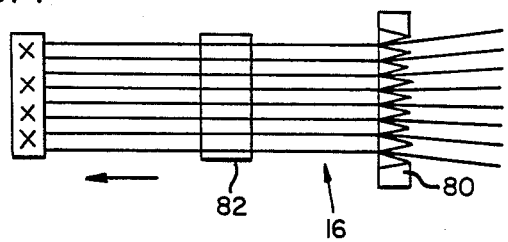
FIGS. 5A–5F diagrammatically illustrate various steps involved in manufacturing light transmission units of the type illustrated in FIG. 4.
Figure 5B:
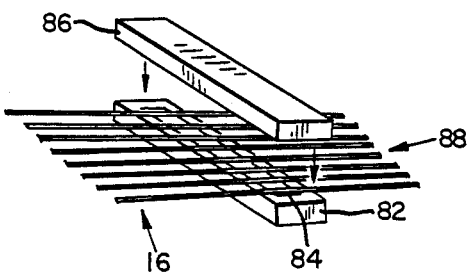
Figure 5C:
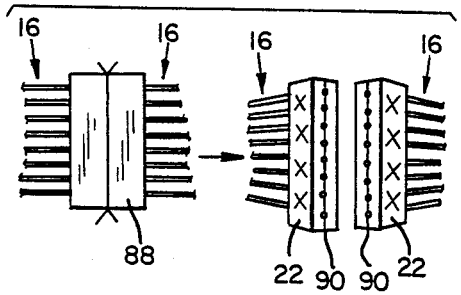
Figure 5D:
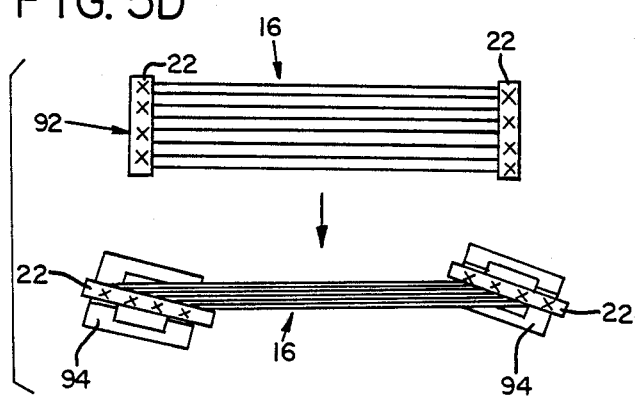
Figure 5E:
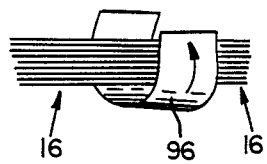
Figure 5F:
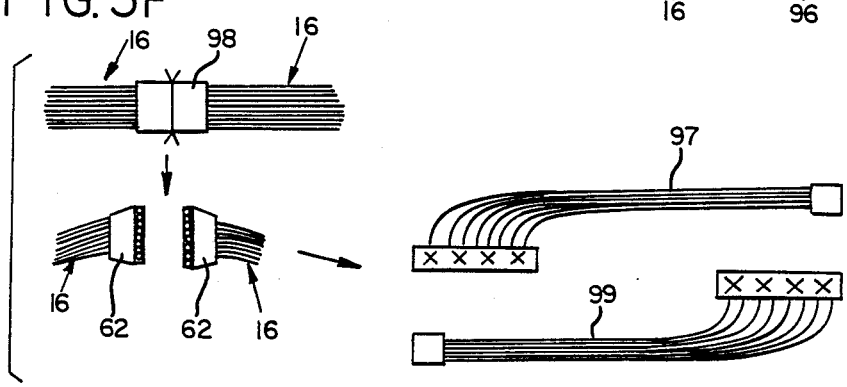

The light transmission units 60 may be readily manufactured from comparatively simple elements. Referring now to FIGS. 5A-5F, the basic steps for manufacturing the subunits 60 are diagrammatically illustrated. As shown in FIG. 5A, a group of eight optical conductors 16 are drawn across a spacing fixture 80 and an elongate substrate strip 82 of foam material. The optical conductors 16 are thereby correctly positioned in a spaced-apart order across the substrate strip 82. As shown in FIG. 5B, epoxy compound 84 is then used to cement a similar foam strip 86 onto the strip 82 to form a block 88 (see FIG. 5C) having an interface along which the optical conductors 16 are mounted. As shown in FIG. 5C, the block 88 is longitudinally severed with a lapidary saw into two output blocks 22. Each of the output blocks 22 includes a group of output terminals formed as the block 88 is cut. The output terminals are arranged in a spaced-apart order along interfaces 90. When the block 88 is cut, a production component 92 (see FIG. 5D) having output blocks 22 at each of its opposite ends is produced. As FIG. 5D shows, the output blocks 22 of this component 92 are then secured in holding jigs 94. The optical conductors 16 are thereby positioned so as to extend between the output blocks 22 in a closely packed order. As further illustrated in FIG. 5E, the optical conductors 16 are wrapped with metal foil tape 96 to hold them in place. A production bundle 98 is thereby formed at a position centrally located between the output blocks 22 (not shown in FIG. 5E). As shown in FIG. 5F, the bundle 98 is severed with a lapidary saw to produce two input bundles 62 of closely packed collinear input terminals formed as the production bundle 98 is cut. When the bundle 98 is cut, two complete light transmission subunits 97 and 99 are produced.

Referring now to FIG. 6, a view is shown illustrating the use of a set of lenses 100 in combination to the input matrix 12. The lenses 100 comprise rod lenses which are positioned in front of and extend parallel with the rows 42 (not shown in FIG. 6) of input terminals 40 and are of a diameter equal to the height of one of the input terminals plus the thickness of a grid plate 32. The lenses 100 serve to concentrate light such as light rays 105 incident to the input matrix into the input terminals 40 which form the rows 42 of the matrix 12, Referring now to FIG. 7, a view is shown of the display matrix 14 illustrating the use of sets of louvers 102 and light dispersing strips 104. The louvers 102 are positioned between output blocks 22 and extend out a short distance from the surface 106 of the display face 24. The louvers 102 function to block ambient light and prevent it from being reflected from the display face 24, thereby improving the contrast of the images displayed. The dispersing strips 104 are positioned so as to extend over the rows 42 (not shown in FIG. 7) of output terminals 48 and function to diffuse light emanating from the output terminals 48. The light emanating from each of the output terminals 48 is thereby dispersed so that the images displayed may be satisfactorily viewed from oblique angles.

As may be apparent from the preceding description, certain changes may be made in the above constructions without departing from the scope of the invention. Therefore, the embodiment described and the drawings are intended to be illustrative in nature and are not meant to be interpreted as limiting the following claims.

We claim:

1. A display system that forms a display image corresponding to a source image provided by a heat-producing image source, comprising:

plural elongate optical conductors each of which includes at opposite ends thereof an input termination and an output termination;

an input matrix having a framework with a set of substantially parallel heat-conducting plates between which the input terminations are mounted in closely-packed rows and columns, the image source delivering light carrying the image and heat to the input terminations from which the heat is conducted by the heat-conductive plates; and a display matrix receiving the optical conductors and having an array of output blocks, each one of the output blocks including a first substrate strip of resilient material and a second substrate strip that support between them a set of the output terminations of the optical conductors, the output terminations compressing the first substrate strips of resilient material to secure the output termination in place and the output blocks being arranged for supporting the output terminations in spaced-apart rows and columns corresponding to the rows and columns of the input matrix, whereby the light delivered to the input terminations is carried along the optical conductors and delivered to the output terminations to form the display image.

2. The display system of claim 1 in which the display image has contrast qualities and is formed by the light emanating from the output terminations, the system further comprising:

plural strips of light-dispersing material extending across the output terminations for diffusing the light emanating from them; and a set of louvers positioned between adjacent rows of the output terminations and extending across the display surface for improving the contrast qualities of the display image.

3. The display system of claim 1 further comprising a set of rod lenses mounted across the rows of input terminations for focusing toward them the light carrying the source image.

4. A transmission unit for a display system that forms a display image corresponding to a source image provided by a heat-producing image source, comprising:

a group of elongate optical conductors each of which includes at opposite ends thereof an input termination and an output termination;

an input bundle that received light carrying the image and heat from the image source, the input bundle including the input terminations and a length of heat-conducting metal foil wrapped around the input terminations to hold them in an adjacent collinear arrangement in which each one of the input terminations has a first linear position within the input bundle, the metal foil conducting from the input terminations the heat received from the image source; and an output block that includes the output terminations and a first substrate strip of resilient material and a second substrate strip that support between them a set of the output terminations in a spaced-apart collinear arrangement in which each one of the output terminations has a second linear position within the output block, the output termination compressing the first substrate strip of resilient material to secure the output terminations in place, whereby the input and output terminations of each optical conductor have similar respective first and second linear positions.

5. The transmission unit of claim 4 in which each one of the optical conductors comprises an optical fiber having a long axis and first and second end surfaces that are substantially perpendicular to the long axis, the end surfaces being polished to facilitate the transmission of light through them, and the input and output transmission comprising the respective first and second end surfaces.

6. A display system that forms a display image corresponding to a source image provided by an image source, comprising:

plural light transmission units, each of which includes a group of elongate optical conductors having at opposite ends thereof input terminations and output terminations, an input bundle having an adjacent collinear arrangement of the input terminations of th group of optical conductors, and an output block having the output terminations of the group of optical conductors and first and second substrate strips between which the output terminations are supported in a spaced-apart collinear arrangement, the first substrate strip being of resilient material that is compressed by the output terminations in cooperation with the second substrate strip; and a framework having a set of substantially parallel plates for mounting the input bundles between the plates to form substantially parallel rows and columns of input bundles, whereby the output blocks of the plural light transmission units are arranged in adjacent substantially parallel rows and columns that correspond to the rows and columns of the input bundles formed by the first framework.

7. The display system of claim 6 in which the image source produces heat that is delivered to the input terminations and the input bundles include a length of metal foil wrapped around the input terminations to hold them in position and conduct the heat from them.

8. The display system of claim 6 in which the second substrate strip of each light transmission unit comprises a resilient material that is compressed by the output terminations in cooperation with the first substrate strip of resilient material.

9. The display system of claim 6 in which the display image corresponds to light emanating from the output terminations, the system further comprising:
- a set of rod lenses mounted across the rows of input bundles for focusing light carrying the source image toward the input terminations; and
- a set of light-dispersing strips mounted across the output terminations for diffusing the light emanating from them.

10. The display system of claim 6 in which the display image has contrast qualities and the system further comprises a set of louvers mounted between and extending along the rows of output blocks for improving the contrast qualities.

* * * * *

UNITED STATES PATENT AND TRADEMARK OFFICE
CERTIFICATE OF CORRECTION

PATENT NO.  : 4,839,635
DATED       : June 13, 1989
INVENTOR(S) : Lee M. Harris, et al.

It is certified that error appears in the above-identified patent and that said Letters Patent is hereby corrected as shown below:

```
Col. 3, line 10, delete "30".

Col. 3, line 43, change "o" to --to--.

Col. 4, line 68, change "," to --.--.

Claim 4, col. 6, line 4, change "received" to --receives--.

Claim 5, col. 6, lines 31 and 32, change "transmission" to
--terminations--.

Claim 6, col. 6, line 42, change "th ®group" to
--the group--.

Claim 6, col. 6, line 58, delete "first".
```

Signed and Sealed this

Twenty-seventh Day of March, 1990

Attest:

JEFFREY M. SAMUELS

*Attesting Officer*   *Acting Commissioner of Patents and Trademarks*